United States Patent [19]

Kay et al.

[11] Patent Number: 4,568,711

[45] Date of Patent: Feb. 4, 1986

[54] SYNERGISTIC ADDITIVE COMBINATION FOR GUAYULE RUBBER STABILIZATION

[75] Inventors: Edward L. Kay, Akron; Richard Gutierrez, Canal Fulton; Walter R. Hausch, Akron, all of Ohio

[73] Assignee: The Firestone Tire & Rubber Company, Akron, Ohio

[21] Appl. No.: 679,656

[22] Filed: Dec. 7, 1984

[51] Int. Cl.$^4$ .......................... C08K 5/32; C09K 15/20
[52] U.S. Cl. ..................... 524/255; 524/254; 524/259; 524/925; 528/930; 252/403; 252/401
[58] Field of Search ............... 524/925, 928, 929, 259, 524/254, 255; 564/441, 410, 300; 525/377; 528/930, 422; 252/401, 403

[56] References Cited

U.S. PATENT DOCUMENTS

| | | | |
|---|---|---|---|
| 2,419,976 | 5/1947 | Trepagnier et al. | 525/377 |
| 2,930,777 | 3/1960 | Leeper et al. | 524/236 |
| 3,268,495 | 8/1966 | Convert et al. | 525/377 |
| 3,384,613 | 5/1968 | Parks | 524/236 |
| 3,734,886 | 5/1973 | Dodman et al. | 524/236 |
| 3,886,106 | 5/1975 | Lohr et al. | 524/236 |
| 4,405,532 | 9/1983 | Gutierrez et al. | 528/930 |
| 4,435,337 | 3/1984 | Kay et al. | 528/930 |

FOREIGN PATENT DOCUMENTS

873598  7/1961  United Kingdom .

OTHER PUBLICATIONS

M. E. Cain et al, "Dev. of Network–Bound Anti–Oxidants for Improved Ageing of Natural Rubber", J. Rubber Research Institute, 22 (3), 289–299, (1969).
J. Rehner et al, "Vulcanization Reactions in Butyl Rubber", Rubber Chemistry & Technology, vol. 19, 900–914, (1946).
"Guayule, An Alternative Source of Natural Rubber", National Academy of Science, Washington, D.C., 1977, p. 25.
Keller, Winkler & Stevens, Paper No. 55, "Degradative Effects of Guayule Resin on Natural Rubber", 117th Meeting, Rubber Division, ACS, Las Vegas, Nevada, (May 1980).
Dunn, "Review of Unsolved Problems in the Protection of Rubber Against Oxidative Degradation", Rubber Chemistry and Technology, 47 960, (1974).
Howard, "Rubber Chemistry and Technology," 47 976, (1974).
Gonzales, Paper No. 2, 116th Meeting, Rubber Division, ACS, Cleveland, Ohio, Oct. 23-26.
R. T. Vanderbilt Co., Inc., advertisement of Butyl Zimate, Chemical & Engineering News, May 11, 1981.
Baldimar Motomochi et al, "Mechanical Drying of Guayule & Hevea, A Pilot Plant Study", paper presented at Third International Guayule Conference, Pasadena, Calif., Apr. 30, 1980.
Ramos & Motomochi, Paper No. 19, "Vulcanization of Guayule Rubber", 116th Meeting, Rubber Division, ACS, Oct. 23-26, 1978, Cleveland, Ohio.

*Primary Examiner*—Veronica P. Hoke
*Attorney, Agent, or Firm*—Daniel N. Hall

[57] ABSTRACT

Combinations of para-phenylene diamines and para di(nitroso) arenes act synergistically in guayule rubber-based compositions to protect them against oxidative degradation. A typically useful diamine is N-(1,3-dimethylbutyl)-N'-phenyl-phenyl-p-phenylene diamine and a useful arene is para-di(nitroso)benzene. Vulcanizable compositions, as well as articles made therefrom, are within the scope of the invention.

16 Claims, No Drawings

SYNERGISTIC ADDITIVE COMBINATION FOR GUAYULE RUBBER STABILIZATION

TECHNICAL FIELD

This invention relates to additive combinations which act synergistically to improve the properties of guayule rubber. More particularly, it relates to vulcanizable and vulcanized compositions comprising synergistic organic chemicals which interact to provide improved stability and aging properties of the composition.

BACKGROUND ART

It is known that useful rubber can be recovered from the guayule shrub *Parthenium argentatum* gray which grows in semiarid regions of North America, such as the southwest United States and northern Mexico. There has been a renewed interest in the commercialization of guayule rubber to supplement natural rubber supplies obtained from the well-known rubber tree Hevea brazilienses. Both guayule and Hevea are considered "natural" rubber.

Unlike Hevea, guayule rubber lacks substantial amounts of natural anti-oxidants and therefore is usually stabilized with adjuvants to prevent rapid degradation upon contact with air (Guayule, *An Alternative Source of Natural Rubber*, National Academy of Science; Washington, D.C.; 1977; page 25). Such anti-oxidants or stabilizers for guayule rubber are usually added during the solution phase purification of the crude guayule rubber (ibid, p 36). Since guayule and Hevea rubbers have chemical and physical properties that are virtually identical (ibid, p 3), it is reasonable to expect that conventional anti-oxidents for Hevea rubber (chemically, cis-1,4-polyisoprene) would be adequate for the stabilization of guayule rubber. Surprisingly, however, Keller, Winkler and Stevens (Paper No. 55, "Degradative Effects of Guayule Resin or Natural Rubber," presented at the 117th Meeting of the Rubber Division, ACS; Las Vegas, Nevada, May 1980) found that linoleic acid, which is a component of guayule resin (which in turn is a potential containment of guayule rubber) has an adverse effect on the stability of guayule rubber. Therefore, from a practical standpoint, stabilizer (anti-oxidant) additive(s) for guayule rubber preferably will prevent the deleterious effects of heat and oxygen (air) on the rubber itself (cis-1,4-structure) and at the same time prevents the deleterious effects of guayule resin which may be present in the guayule rubber.

Many chemical compositions have been shown to be effective anti-oxidants for rubber. For example, Dunn in his article, "Review of Unsolved Problems in the Protection of Rubber Against Oxidative Degradation," *Rubber Chemistry and Technology* 47 960 (1974), stated that over three thousand patents issued in a ten-year period relating to the protection of polymers against aging effects. Dunn also pointed out that because of "antagonism" phenomena, an anti-oxidant which proves highly effective in one rubber may be totally ineffective in another. Howard (*Rubber Chemistry and Technology* 47, 976 (1974) discussed synergism between various anti-oxidant types.

The following publications disclose the use of specific compounds as stabilizers for guayule rubber:

1. Gonzales (Paper No. 2, 116th Meeting of the Rubber Division, ACS, Cleveland, Ohio, Oct. 23–26, 1979) discloses the results of studies of stabilization of guayule rubber with phenolic compounds (thiomethylene-coupled as well as alkylated) and N,N'-diphenyl-p-phenylenediamine. The synergistic combinations of the present invention were apparently not investigated by Gonzales.

2. Butyl Zimate ®, a product of R. T. Vanderbilt Co., Inc. and chemically identified as the zinc salt of di-n-butyldithiocarbamic acid, has been reported to be an excellent stabilizer for guayule rubber (see, for example, *Chemical & Engineering News*, May 11, 1981).

3. The Chemical and Engineering News disclosure also stated that Butyl Zimate ® alone or in combination with Agerite ® Geltrol ® is the optimum stabilizer for Kraton ® 1107-based hot melts. Agerite ® Geltrol ®, another product of R. T. Vanderbilt, is identified chemically in *Rubber World; Materials and Compounding Ingredients for Rubber*, 1968 Edition, p. 97 as a modified high molecular weight hindered phenol. The same material has also been identified as an alkylated-arylated bisphenolic phosphite in the Vanderbilt Rubber Handbook (page 388), R. T. Vanderbilt Co., Inc. Norwalk, CT, USA 06855 (1978 Edition).

4. Baldemar Motomochi, Posguale G. Galioto and Hans R. Strop disclosed in their publication entitled, "Mechanical Drying of Guayule and Hevea: A Pilot Plant Study" (a paper presented at the Third International Guayule Conference, Pasadena, Calif., Apr. 30, 1980) the use of 50 percent Butyl Zimate ®/50 percent AgeRite Superlite ® at a 1 percent level in guayule rubber as a stabilizer system. AgeRite Superlite ® is identified as a mixture of polybutylated Bisphenol A; the latter is, of course, a phenolic compound. No mention, however, of any synergistic interactions was made.

5. "BHT," butylated hydroxy toluene, was reportedly used as an anti-oxidant for stabilization of guayule rubber in the Saltillo, Mexico pilot plant (Paper No. 19, "Vulcanization of Guayule Rubber;" L. F. Ramos and B. Motomochi; presented at the 116th Meeting of the Rubber Division, ACS, Oct. 23–26, 1978 in Cleveland, Ohio).

Use of the synergistic antioxidant combinations of the present invention in guayule rubber has not been reported.

DISCLOSURE OF INVENTION

It is therefore an aspect of the present invention to provide a synergistic combination of paraphenylene diamine and dinitrosoarene antioxidants in a rubber.

It is yet another aspect of the present invention to provide a synergistic combination of antioxidants in a rubber, as above, wherein the amount of said paraphenylene diamine and dinitrosoarene ranges from about 0.1 to about 5.0 parts by weight per 100 parts by weight of said rubber.

It is a still further aspect of the present invention to provide a synergistic combination of antioxidants in a rubber, as above, wherein said rubber is guayule.

In general, a vulcanizable elastomeric composition comprises guayle rubber and an anti-oxidant amount of synergistic combination of (a) at least one (A) paraphenylene diamine and (b) at least one (B) para(dinitroso arene).

BEST MODE FOR CARRYING OUT THE INVENTION

The present invention comprises positive synergistic combinations of (A) at least one paraphenylene diamine and (B) at least one paradi(nitroso)arene, such as poly-p-di(nitroso)benzene, and their use in guayule rubber-based composition to prevent or inhibit oxidative attack of the rubber. Thus, vulcanizable elastomeric compositions comprising guayule rubber and these combinations as well as vulzanizates and articles made therefrom, are also within the scope of the invention.

It has unexpectedly been discovered that para-phenylenediamines and para-di(nitroso)arenes, such as poly-p-di(nitroso)benzene, function in a positive synergistic manner to stabilize guayule rubber against oxidative attack. Specifically, it has been found that combinations of materials, such as N-(1,3-dimethylbutyl)-N'-phenyl-p-phenylenediamine and N,N'-bis(1-ethyl-3-methylpentyl)-p-phenylenediamine with, for example, poly-p-di(nitroso)benzene effect stabilization of guayule rubber to an extent greater than would be expected from the use of the individual additives in amounts equal to or greater than the total amount of stabilizers used.

The para-phenylenediamines (A) of the present invention can be presented by the structural formula

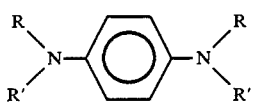

Formula 1 wherein each R is independently hydrogen, or R', and each R' is independently an alkyl, cycloalkyl, aryl, or an alkyl substituted aryl group. Said alkyl group can have 1 to 12 carbon atoms, preferably 1 to 8 carbon atoms; said cycloalkyl group can have 5 to 12 carbon atoms, preferably 6 to 10 carbon atoms; said aryl group or said alkyl substituted aryl group can have from 6 to 18 carbon atoms with 6 to 12 carbon atoms being preferred. Specific examples of such groups include methyl, ethyl, isomeric propyl, butyl, pentyl, hexyl, octyl, decyl, indecyl, dodecyl (including tetra propyl), phenyl, naphthyl, benzyl, ethylphenyl, and the like.

Specific examples of useful para-phenylene diamines include N-(1,3-dimethylbutyl)-N'-phenyl-p-phenylenediamine which is typical of N-alkyl-N'-aryl-p-phenylenediamines and N,N'-bis(1-ethyl-3-methylpentyl)-p-phenylenediamine.

The para-di(nitroso)arenes (B) useful in this invention include composition which can be presented by the formula:

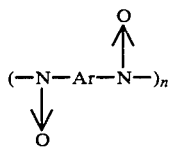

Formula 2 wherein Ar is a divalent aromatic group with nitroso groups in para positions or an alkyl substituted aryl having from 7 to 12 carbon atoms and n is an integer indicating the approximate number of units, e.g., 5 to 30 with 10 to 30 being preferred, joined together to form the polymeric dinitrosobenzenes. Typically, Ar is phenylene, that is, $-C_6H_4-$. For reasons of economy and convenient availability, poly-p-(dinitroso)benzene) is often used in the synergistic compositions of this invention.

The synergistic combinations (A) and (B) of this invention are used in guayule rubber-based compositions in an anti-oxidant amount. Generally, this means the total amount of combination present is in the range of about 0.01–10 parts (by weight) per hundred parts (by weight) rubber (phr). Usually, approximately equal amounts of (A) and (B) are present, but in the broader aspects of the invention 0.01–5 phr (A) and 0.01–5 phr (B) can be present. Typically, 0.25–0.30 phr (A) and 0.05–0.10 phr (B) are present.

The vulcanizable and vulcanized elastomeric compositions which are stabilized by the combinations of this invention are guayule rubber-based that is, they contain a substantial, that is, more than 25 weight percent guayule rubber. Often, guayule rubber is the only elastomer (rubber) constituent. In other instances, at least one other elastomeric constituent, in addition to guayule rubber, is present in the composition. This other elastomeric constituent can be Hevea rubber, synthetic rubber, e.g., styrene-butadiene rubber (that is SBR), nitrile rubber, butyl rubber, random ethylene-propylene rubber, ethylene-propylene block copolymers, ethylene-propylene diene monomer rubber, neoprene (that is polychloroprene), polybutadiene, or mixtures thereof. Conventional rubber additives such as reinforcing agents (carbon black, silica, etc.), fillers, vulcanization agents, accelerators, retarders, and the like, can also be present in conventional amounts.

EXPERIMENTAL TECHNIQUES

To evaluate the thermo-oxidative stability of guayule rubber compositions containing the synergistic stabilizer combinations of the present invention, a Wallace Plastimeter was used. Experimental results obtained with this instrument are generally accepted by skilled workers in the art as relatively accurate evaluations of the thermo-oxidative stability of Hevea rubber.

The ASTM D3194-73 procedures were followed in the initial experimental work (1980 Annual ASTM Standards; Rubber, Natural and Synthetic-General; Part 37, page 712). However, in order to differentiate between the very effective stabilizer combinations of the invention, the ASTM procedure was modified by aging single samples (rather than three samples) at 140° C. for the designated 30-minute intervals as well as for 60-, 90-, and 120-minute intervals to increase the severity of the test. By this modified procedure, it was possible to develop trends of oxidative stability under rather severe conditions. It should be noted that if the data summarized in the following tables contain only a Po and PRI value for 30 minutes aging, the standard ASTM D3194-73 procedure was followed. If values are given for 30, 60, etc. minutes, the modified procedure was used. It should also be noted that one, rather than three, sample was used when the time of forced-air aging at 140° C. was extended from 30 to 120 minutes. Sample preparation and testing in the Wallace Plastimeter were according to the ASTM D3194-73 procedure.

In the following discussions, Po represents the plasticity value for the unaged rubber sample, PA, the plasticity value for the sample aged for the designated time and PRI (Plasticity Retention Index), the ratio of aged plasticity/unaged plasticity expressed as a percent; that is (Pa/Po)100=PRI.

EXAMPLE 1

To demonstrate the efficacy of the inventive synergistic stabilizer combinations, guayule rubber-based compositions with and without stabilizer combinations were evaluated in the Wallace Plastimeter. Data from unstabilized guayule rubber as well as Hevea rubber are summarized in Table I and included for comparison. The Heva sample is representative of a commercial product having adequate thermo-oxidative stability for both longterm storage and to prevent undue degradation during mixing of the rubber with compounding ingredients prior to vulcanization.

Referring to Table I, results on three examples of unstabilized guayule rubber are recorded. The Po values for these samples range from 42 to 45 as compared to 45 and 48 Po values obtained on the Hevea rubber sample. These results indicate that the unaged bulk viscosities of guayule and Hevea rubbers are similar.

Referring to the 30 minute PA values, it is readily apparent that the PA values of 2 to 3 obtained for the guayule rubber sample are significantly lower than the 19 and 20 PA results for Hevea. The results demonstrate that the guayule rubber samples are not adequately stabilized. Samples of these unstabilized guayule rubber stocks were used in our subsequent investigation.

The PA values on the guayule rubber samples after further forced-air oven treatment were essentially zero (too low to accurately measure). In contrast, the PA values of the Hevea sample gradually decreased from 20 to 30 minutes to 4 after 120 minutes. Since Hevea rubber performs very well in industrial applications, Wallace Plastimeter data on experimental stabilized guayule rubber samples greater than the results obtained on Hevea would indicate that the thermo-oxidative stability of the guayule rubber sample would be adequate for commercial uses.

TABLE I

Stability of Reference Elastomers

| Rubber Sample | Wt. % Resin* | Po | PA After Minutes | | | | PRI After Minutes | | | |
|---|---|---|---|---|---|---|---|---|---|---|
| | | | 30 | 60 | 90 | 120 | 30 | 60 | 90 | 120 |
| Guayule | | | | | | | | | | |
| No. 1 | 1.0 | 42 | 2 | — | — | — | 5 | — | — | — |
| No. 2 | 1.3 | 43 | 2 | — | — | — | 5 | — | — | — |
| No. 3 | 1.0 | 45 | 3 | 0 | 0 | 0 | 7 | 0 | 0 | 0 |
| Hevea** | 1.4 | 45 | 19 | — | — | — | 42 | — | — | — |
| | 1.4 | 48 | 20 | 9 | 7 | 4 | 42 | 19 | 15 | 8 |

*Determined by Acetone extraction
**Commercial sample

EXAMPLE II

Wallace Plastimeter data obtained from Guayule rubber containing the positive synergistic additive combinations of the invention are summerized in Table II.

For the sake of brevity, the commercially available N-(1,3-dimethylbutyl)-N'-phenyl-p-phenylenediamine is designated additive "A" and poly-p-dinitrosobenzene is designated additive "B."

Referring to the data in Table II, it can be noted that additive "A" at concentrations in the unstabilized guayule base rubber ranging from 1.00 to as low as 0.25 phr does not significantly change the Po value of the base rubber but very effectively increases the PA values experimentally observed after 30, 60, 90 and 120 minutes of forced air oven aging of the samples.

Overall, the data on the base guayule rubber containing additive "A" agree with expected results; additive "A" functions as an effective stabilizer and, as the concentration of additive "A" decreases, the thermo-oxidative stability of the experimental sample decreases.

Interpretation of the experimental data from the guayule rubber samples containing additive "B" at the 0.05 phr level indicates that the bulk viscosity of the sample actually increases during the 30-minute forced air oven aging (Po—46 and the 30 minute PA=54) resulting in a PRI value greater than 100 (117). At the lower concentrations of additive "B," the PA values are always lower than the Po value resulting in relatively low PRI values.

Referring to the plasticity values on the samples containing both additives "A" and "B," it will be noted that the Po values are generally higher than the Po values of the base rubber (Table I, Po values of 42, 43 and 45). These results indicate that the presented additive "B" is causing an increase in the bulk viscosity of the samples especially evident at the 0.50 phr level. At the lower total additive levels of 0.35 and 0.30 phr, the increases in bulk viscosity are less. Comparison of the results from samples containing the combinations of "A" and "B" with samples containing the individual components indicates that additive "A" is activating additive "B" relative to the ability of additive "B" to increase the bulk viscosity of the base guayule rubber.

In general, the samples containing the combinations of additives "A" and "B" (total additive level of 0.35 and 0.30 phr) have higher PRI values at 30 through 120 minutes than the samples containing as high as 1.00 phr additive "A" or as high as 0.50 phr of additive "B" individually. These results clearly demonstrate a positive synergistic interaction between additive "A" and "B" for the stabilization of guayule rubber.

TABLE II

Positive Synergistic Additive Combination A & B

| Guayule Rubber phr Additive | | | PA After Minutes | | | | PRI After Minutes | | | |
|---|---|---|---|---|---|---|---|---|---|---|
| A | B | Po | 30 | 60 | 90 | 120 | 30 | 60 | 90 | 120 |
| 1.00 | — | 43 | 28 | 22 | 19 | 24 | 65 | 51 | 44 | 56 |
| 0.50<sup>a</sup> | — | 43 | 25 | 20 | 17 | 15 | 58 | 47 | 40 | 34 |
| 0.25<sup>b</sup> | — | 47 | 24 | 18 | 16 | 14 | 51 | 39 | 35 | 30 |
| 0.10 | — | 48 | 22 | 19 | 17 | 13 | 46 | 40 | 35 | 30 |
| — | 0.50 | 46 | 54 | 35 | 22 | 15 | 117 | 76 | 48 | 43 |
| — | 0.25 | 54 | 34 | 16 | 11 | 6 | 63 | 30 | 20 | 11 |
| — | 0.10<sup>c</sup> | 49 | 18 | 9 | 5 | 0 | 37 | 18 | 10 | 0 |
| — | 0.05 | 47 | 10 | 5 | 0 | 0 | 21 | 11 | 0 | 0 |
| 0.50 | 0.50 | 80 | 84 | 78 | 65 | 60 | 105 | 98 | 81 | 75 |
| 0.25 | 0.10 | 81 | 46 | 41 | 37 | 32 | 90 | 80 | 73 | 63 |
| 0.25 | 0.05 | 46 | 42 | 36 | 33 | 27 | 91 | 78 | 72 | 59 |

<sup>a</sup>Average of two experiments
<sup>b</sup>Average of four experiments
<sup>c</sup>Average of two experiments
A = N—(1,3-dimethylbutyl)-N'—phenyl-p-phenylenediamine
B = poly-p-di(nitroso)benzene

EXAMPLE 3

In order to better define the scope of the invention, samples of the base guayule rubber with a N,N'-bis(alkyl)-p-phenylenediamine were prepared; specifically, N,N'-bis(1-ethyl-3-methylpentyl)-p-phenylenediamine which is designated additive "C." Combinations of additive "C" with poly(p-dinitrosobenzene) (additive "B" designation as above) were also prepared and evaluated in the Wallace Plastimeter. Test data are summarized in Table III. The test data for samples containing additive "B" alone reported in Table II are also included in Table III for ease in interpretation of the test results.

As shown in Table III, additive "C," when used alone in the base guayule rubber, imparts relatively good oxidation stability. At a 0.50 phr level of additive "C," the respective 30 and 120 minute PRI values are 67 and 52 good thermo-oxidative stability. Actually, the PRI values the test sample containing 0.25 phr additive "C" are good and are considered essentially equivalent to the results obtained on the sample containing 0.50 phr of additive "C." However, the results obtained on the sample containing 0.05 phr additive "B" and 0.25 phr additive "C" combination are the best of all the results recorded in Table III, that is, the PRI values remain relatively high at 30 through 120 minutes of forced air oven aging.

TABLE III

| Positive Synergistic Additive Combination B & C | | | | | | | | | | |
|---|---|---|---|---|---|---|---|---|---|---|
| Guayule Rubber phr Additive | | | WALLACE PLASTIMETER MEASUREMENTS | | | | | | | |
| | | | PA After Minutes | | | | PRI After Minutes | | | |
| B | C | Po | 30 | 60 | 90 | 120 | 30 | 60 | 90 | 120 |
| 0.50 | — | 46 | 54 | 35 | 22 | 15 | 117 | 76 | 48 | 43 |
| 0.10 | — | 45 | 18 | 9 | 6 | 0 | 40 | 20 | 13 | 0 |
| 0.05 | — | 47 | 10 | 5 | 0 | 0 | 21 | 11 | 0 | 0 |
| — | 1.00 | 42 | 31 | 29 | 27 | 23 | 74 | 69 | 64 | 55 |
| — | 0.50 | 42 | 28 | 25 | 24 | 22 | 67 | 60 | 57 | 52 |
| — | 0.25 | 43 | 30 | 25 | 25 | 24 | 70 | 58 | 58 | 56 |
| 0.05 | 0.25 | 50 | 47 | 39 | 33 | 32 | 94 | 78 | 66 | 64 |

C = N,N'—bis(1-ethyl-3-methylpentyl)-p-phenylenediamine

While in accordance with the patent statutes, a preferred embodiment and best mode has been set forth in detail, the scope of the invention is measured by the scope of the attached claims.

What is claimed is:

1. A vulcanizable elastomeric composition comprising guayule rubber and a synergistic combination of (a) at least one (A) paraphenylene diamine and (b) at least one (B) para(dinitroso arene), wherein said (A) is represented by the formula:

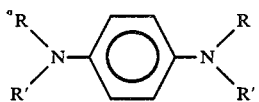

wherein R is independently hydrogen or R', and each R' is independently an alkyl having from 1 to 12 carbon atoms, a cycloalkyl having from 5 to 12 carbon atoms, or an aryl or an alkyl substituted aryl having from 6 to 18 carbon atoms, and said (B) is represented by the formula

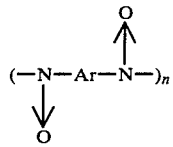

wherein Ar is a divalent arene group or an alkyl substituted phenyl having the nitroso groups in a para position and n is about 5 to 30, and wherein the amount of (A) is from about 0.01 to about 5 parts by weight phr and wherein the amount of (B) is from about 0.01 to about 5 parts by weight phr.

2. The composition of claim 1, wherein each R is R'.
3. The composition of claim 2 wherein each of said $R^1$ radicals is independently an alkyl having about 1 to 12 carbon atoms.
4. The composition of claim 4, wherein each of said $R^1$ radicals is independently a pentyl, hexyl, octyl, decyl, or dodecyl group.
5. The composition of claim 3, wherein each of said $R^1$ radicals is independently an aryl or an alkyl substituted aryl having from 6 to 8 carbon atoms.
6. The composition of claim 1, wherein each R radical is independently $R^1$ and each of said $R^1$ radicals is independently an alkyl group having from 1 to 8 carbon atoms or an aryl or alkyl substituted aryl having from 6 to 12 carbon atoms, and wherein Ar is phenylene or an alkyl substituted aryl having 7 to 12 carbon atoms.
7. The composition of claim 6, wherein said guayule rubber is the only rubber constituent.
8. The composition of claim 6, including at least one other elastomeric constituent, in addition to said guayule rubber, in said composition.
9. The composition of claim 8, wherein said other elastomeric constituent is Hevea rubber, synthetic rubber, or a mixture thereof.
10. The composition of claim 6, wherein the concentration of (A) is about 0.25 to about 0.30 parts per hundred parts of rubber and the concentration of (B) is about 0.05 to about 0.10 parts per hundred parts of rubber.
11. A vulcanized composition made by vulcanizing the composition of claim 1.
12. A rubber article of manufacture made from the composition of claim 11 in combination with guayule rubber.
13. The composition of claim 11, wherein said (A) is N-(1,3-dimethylbutyl)-N'-phenyl-p-phenylenediamine or N,N'-Bis(1-ethyl-3-methylpentyl)-p-phenylenediamine and wherein said (B) is poly-p-(dinitroso)benzene.
14. A synergistic anti-oxidant composition for guayule rubber compositions comprising; in combination, about 0.5 to about 5 parts by weight of (A) at least one para phenylene diamine and about 0.05 to about 5 parts by weight of (B) at least one para di(nitroso)arene, for every 100 parts by weight of the guayule rubber, wherein (A) is represented by the formula:

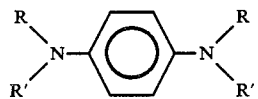

wherein each R is independently hydrogen or R', and each R' is independently alkyl having from 1 to 12 carbon atoms, a cycloalkyl having from 5 to 12 carbon atoms, or and aryl or an alkyl substituted aryl having from 6 to 18 carbon atoms, and said (B) represented by the formula:

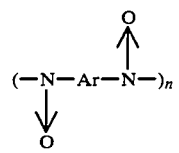

wherein Ar is a divalent arene group or an alkyl substituted phenyl having from 7 to 12 carbon atoms having the nitroso groups in a para position and n is about 5 to 30.

15. A composition according to claim 1, wherein each R is independently R' and each said R' is independently an alkyl group having from 1 to 8 carbon atoms, or an aryl or alkyl substituted aryl having from 6 to 12 carbon atoms, and wherein Ar is phenylene or an alkyl substituted aryl having from 7 to 12 carbon atoms.

16. A composition according to claim 15, wherein the amount of said (A) is about 0.25 to about 0.30 parts by weight and wherein the amount of said (B) is about 0.05 to about 0.10 parts by weight.

* * * * *